United States Patent [19]

Cross et al.

[11] 4,211,467

[45] Jul. 8, 1980

[54] OPTICALLY-CONTROLLED TWO-CHANNEL INTEGRATED OPTICAL SWITCH

[75] Inventors: Peter S. Cross, Middletown; Ronald V. Schmidt, Matawan, both of N.J.

[73] Assignee: Bell Telephone Laboratories, Incorporated, Murray Hill, N.J.

[21] Appl. No.: 869,364

[22] Filed: Jan. 13, 1978

[51] Int. Cl.² .............................................. G02B 5/14
[52] U.S. Cl. .................................................. 350/96.14
[58] Field of Search ............. 350/96.13, 96.14, 355, 350/356; 332/7.51

[56] References Cited
U.S. PATENT DOCUMENTS

| | | | |
|---|---|---|---|
| 3,944,812 | 3/1976 | Hattori | 350/96.14 |
| 3,995,311 | 11/1976 | Taylor | 350/96.14 |
| 4,021,113 | 3/1977 | Kogelnik et al. | 350/96.14 |

OTHER PUBLICATIONS

P. W. Smith, E. H. Turner, "A Bistable Fabry–Perot Resonator", Applied Physics Letters, vol. 30, No. 6, Mar. 1977, pp. 280–281.

*Primary Examiner*—Rolf G. Hille
*Attorney, Agent, or Firm*—Daniel D. Dubosky

[57] ABSTRACT

An integrated optically-controlled 4-port bistable switch having a waveguide directional coupler as one of its elements is disclosed. A photodetector is positioned so as to be sensitive to the optical energy at one output port of the directional coupler and the voltage developed by this photodetector is coupled to electrode elements of the directional coupler. The resulting bistable device permits such functions as remote optical switching to be performed.

8 Claims, 8 Drawing Figures

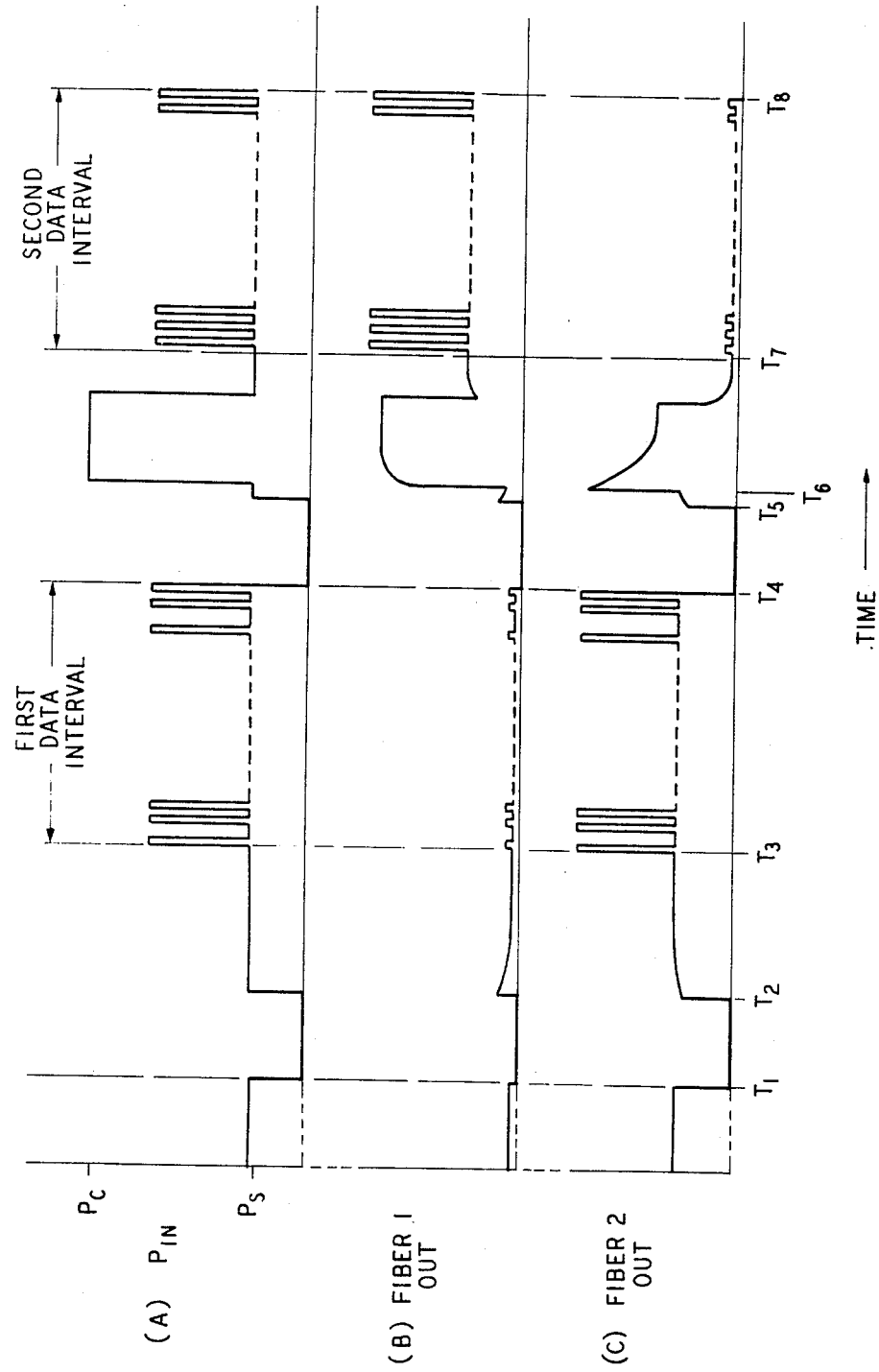

OPTICALLY-CONTROLLED TWO-CHANNEL INTEGRATED OPTICAL SWITCH

BACKGROUND OF THE INVENTION

This invention relates to optical switches and more particularly to optical switches that utilize waveguides in an electro-optic medium.

One type of optical switch in the prior art is disclosed in U.S. Pat. No. 4,012,113 to H. W. Kogelnik and R. V. Schmidt entitled, "Adjustable Optical Switch or Modulator", and issued Mar. 15, 1977. In this Kogelnik et al patent two strip waveguides are formed in an electro-optic substrate and are positioned in the substrate such that the waveguides are parallel to each other and sufficiently close over an interaction length such that coupling is achieved from one waveguide to the other. At least two pairs of electrode elements are positioned proximate to the waveguides in the interaction length region such that opposite electric fields can be established in each of the two waveguides by applying opposite potentials across adjacent pairs of the electrode elements. Electric adjustability of both the crossover and straight-through states is achieved. This switch, however, is operated entirely in response to the potentials applied to the electrode elements and there is no suggestion in the Kogelnik et al patent as to how this switch can be operated in response to optical pulses within the optical pulse stream.

Optical switches or bistable elements that can be operated by optical pulses have been disclosed in the prior art using a variety of nonlinear optical materials within a Fabry-Perot resonator. One such device which has been recently disclosed uses an electro-optic medium within the Fabry-Perot cavity. See for example the article entitled, "A Bistable Fabry-Perot Resonator", by P. W. Smith and E. W. Turner, *Applied Physics Letters*, Vol. 30, Mar. 15, 1977, pages 280–281. In this latter device the optical energy present at the output of the cavity is caused to energize a photodetector whose output voltage is coupled back to electrode terminals that change the refractive index of the electro-optic medium. These devices that use a Fabry-Perot cavity suffer the disadvantage that they have only two ports and that any power not transmitted through the device is reflected and is difficult to use.

SUMMARY OF THE INVENTION

A primary object of the present invention is to switch input optical energy between either one of two output ports in an integrated optics type switch. This object and others are achieved in accordance with the present invention wherein a photodetector element is positioned so as to be sensitive to the optical energy at one output port of an optical switch of the type disclosed in the above-identified patent to Kogelnik et al. The voltage developed by this photodetector element is coupled to the electrode elements of the electro-optically switched directional coupler. In accordance with one feature of the present invention, a third waveguiding element is added to the substrate of the directional coupler and positioned with respect to one of the waveguides such that it receives a sampling of the energy present in that waveguide. The photodetector element is an avalanche photodiode positioned so as to receive the energy in this third waveguiding element. As a result, the optical energy in each one of the waveguides of the directional coupler can be fully utilized in output devices such as optical fibers that are butt-joined to the waveguiding structure. The resulting device permits optical pulses at either one of the input ports to switch the data present at an input port between either one of the two output ports provided by the two waveguides.

BRIEF DESCRIPTION OF THE DRAWINGS

The invention will be more readily understood after reading the following detailed description taken in conjunction with the drawings wherein:

FIG. 8 discloses waveforms that are useful in describing the operation of the device disclosed in FIG. 7.

DETAILED DESCRIPTION

Figure 1:
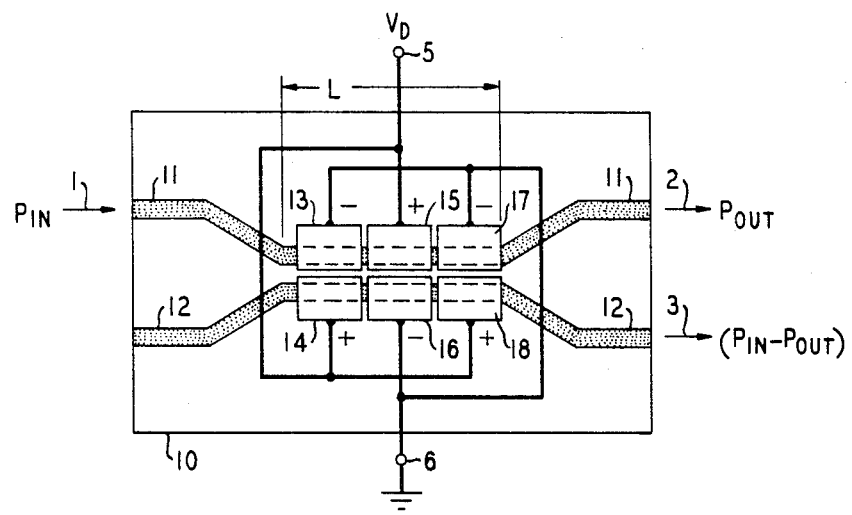
FIG. 1 is a pictorial diagram of an electro-optically switched directional coupler substantially identical to the type disclosed in the above-identified Kogelnik-Schmidt patent.

In FIG. 1 an electro-optically switched directional coupler of the type disclosed in the above-identified Kogelnik-Schmidt patent is shown. The techniques and apparatus described in that patent, U.S. Pat. No. 4,012,113, are directly applicable to one of the elements utilized in the present invention and for this reason that patent is incorporated herein by reference. In switched directional couplers of this type two waveguides designated as 11 and 12 in FIG. 1 are formed in an electro-optic substrate 10. These waveguides can be formed by diffusing titanium strips into a lithium niobate substrate. Multisection electrodes designated as 13 through 18 in FIG. 1 are then deposited over the waveguides and a drive voltage $V_D$ is then connected across terminals 5 and 6. The multisection electrodes 13 through 18 are wired to terminals 5 and 6 in a way such that the direction of the applied electric field reverses from section to section. The alternating electric field induces an alternating phase-mismatch ($\Delta\beta$) between the waveguides that allows low cross talk switching to be achieved without stringent fabrication tolerances. The required drive voltage is reduced by increasing the length of the interaction region where the waveguides are parallel and proximate to each other and further by using multisection electrodes. In the specific device used in the implementation of the present invention, the waveguides were caused to have an interaction length L of approximately 2 centimeters and 12 sections of electrode pairs. In FIG. 1, as in the other drawings that follow, only three sections or electrode pairs are shown in order to simplify the drawings.

Figure 2:
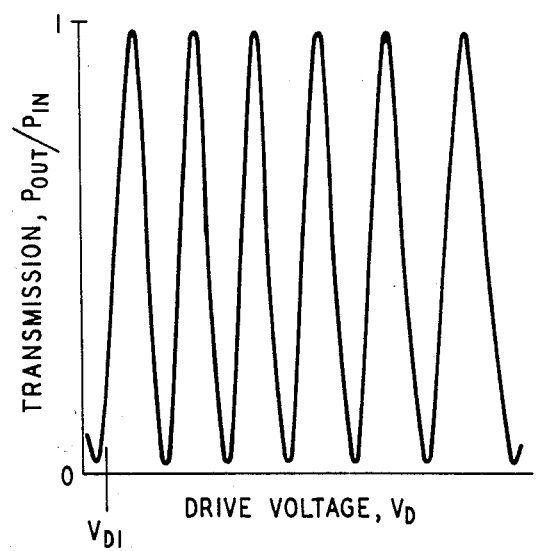
FIG. 2 is a graph of transmission versus drive voltage that represents the operation of a typical prior art switched directional coupler having multiple sections of $\Delta\beta$ reversal.

In FIG. 1 light energy having a power of $P_{IN}$ and designated by ray 1 is caused to be incident on the input port of waveguide 11. The optical power available in the output ports of waveguides 11 and 12 is designated by rays 2 and 3 in FIG. 1 and the relative power at each of these output ports depends on the applied drive voltage $V_D$. As indicated in FIG. 1 any of the optical power that does not appear at the output port of waveguide 11 appears at the output port of waveguide 12. The transmission versus drive voltage behavior of a typical device of the type shown in FIG. 1 is shown in the graph of FIG. 2. As indicated in FIG. 2, the percentage of input power that appears at the output port of waveguide 11 tends to vary between a value close to 0 and a value close to 1 depending on the value of the applied drive voltage $V_D$. The details of this switching characteristic depend upon the specific physical parameters of the device, but this characteristic is in general oscillatory, and in the specific embodiment constructed, about 2 volts was required in order to switch substantially all of the power from one output port to the other.

Unlike the device disclosed in the Kogelnik-Schmidt patent, the directional coupler used in the present invention should have minima in the switching characteristic of FIG. 2 that are above zero. These imperfect or poor zeros are required in accordance with the present invention in order to achieve the bistable operation to be described hereinafter. These poor or imperfect zeros are frequently obtained in practice even though attempts are made to create perfect zeros; they can be obtained by intentionally translating the electrodes with respect to the interaction length region of the waveguides. This intentional translation can be implemented by allowing a small portion of the interaction length region to remain exposed, that is, not covered by an electrode pair as indicated in FIG. 1.

Figure 3:
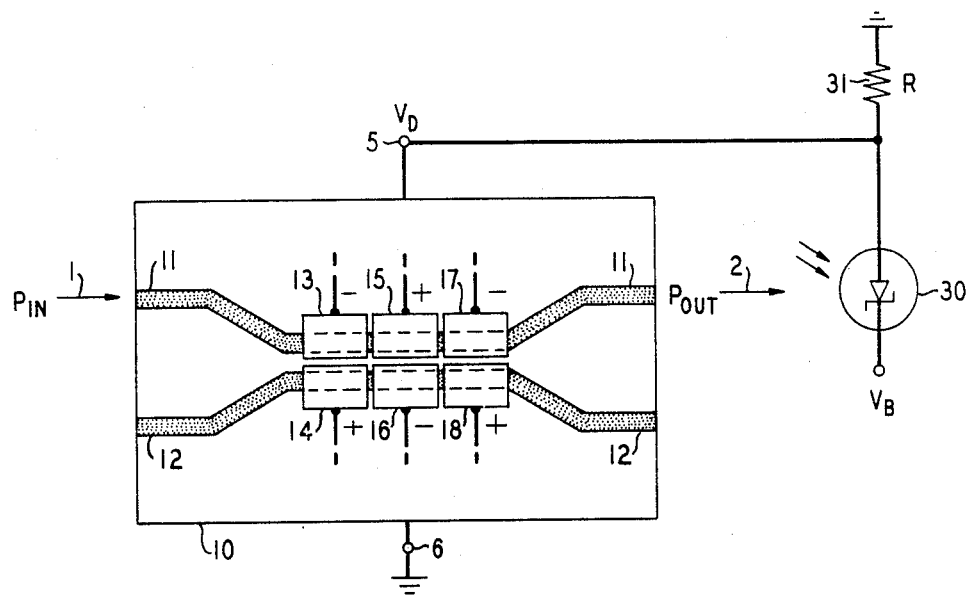
FIG. 3 is a pictorial representation of an apparatus constructed in accordance with the present invention.

Apparatus constructed in accordance with the present invention is illustrated in FIG. 3. A directional coupler of the type shown in FIG. 1 and described hereinabove is positioned such that the optical energy present at the output port of waveguide 11 is caused to impinge on an avalanche photodiode 30. This avalanche photodiode 30 has its cathode connected to receive a bias of $V_B$ and its anode is connected both to a load resistor R and to terminal 5 of the directional coupler. The other end of load resistor R is connected to a reference potential which is also connected to terminal 6. The apparatus of FIG. 3 has a characteristic of power-out versus power-in of the type illustrated by curve 40 in FIG. 4. The shape of this curve 40 in FIG. 4 can be understood by recognizing that the transmission characteristic shown in FIG. 2 can be expressed by the function $f(V_D)$ as follows:

$$P_{OUT}/P_{IN}=f(V_D). \quad (1)$$

Figure 4:
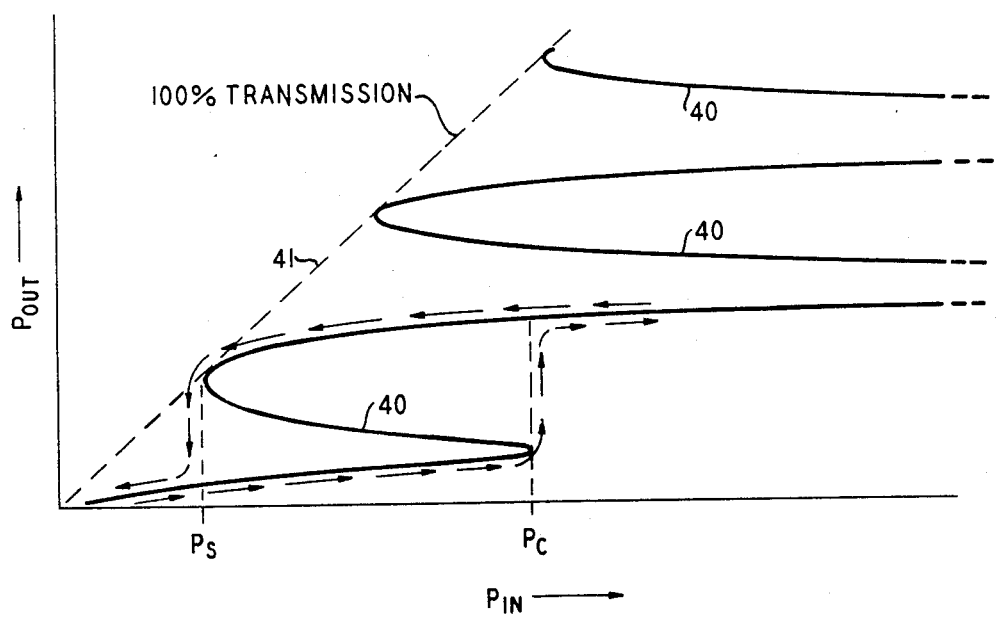
FIGS. 4, 5, and 6 are curves that are useful in describing the operation of the apparatus in FIG. 3.

If a portion of the energy at the output port of one of the waveguides is detected and used to develop the drive voltage $V_D$, the latter voltage can be expressed by the following equation:

$$V_D=\gamma P_{OUT}R \quad (2)$$

where $\gamma$ is the current responsivity of the detector monitoring the output and R is the load resistor. By substituting Equation 2 into Equation 1, $P_{OUT}$ becomes a multivalued function of $P_{IN}$ with $\gamma R$ as a parameter as shown in FIG. 4. A qualitative understanding can be developed for the shape of curve 40 in FIG. 4 by rewriting Equation 1 in the following form:

$$P_{IN}=P_{OUT}/f(V_D). \quad (3)$$

If $f(V_D)$ were equal to 1, $P_{IN}$ equals $P_{OUT}$ and this corresponds to the dotted line 41 in FIG. 4 which in turn corresponds to 100 percent transmission of the input power to the output port of waveguide 11. For the values of drive voltage $V_D$, however, that cause the transmission characteristic in FIG. 2 to dip to a value close to 0, the value of $P_{IN}$ must be extremely large to develop any significant value of $P_{OUT}$. Hence, at those points where $f(V_D)$ is at a minimum, curve 40 is at a high value on the abscissa in FIG. 4.

Optical hysteresis is achieved by the apparatus in FIG. 3 by varying the input power level as indicated by the arrows in FIG. 4. If the input power $P_{IN}$ is increased from zero, the output power from waveguide 11 must follow the lowest branch of curve 40. When $P_{IN}$ is increased past the value designated as $P_C$ in FIG. 4, the lowest branch no longer exists for these values of $P_{IN}$ and the output power must jump to the second branch of the charateristic. Increasing $P_{IN}$ still further can result in subsequent jumps to higher order branches. If $P_{IN}$ is decreased, $P_{OUT}$ declines along the second branch until an input power of $P_S$ is reached. For values of $P_{IN}$ lower than $P_S$ the second branch no longer exists and the device must jump back down to the first branch as indicated by the arrows in FIG. 4. Hence, the apparatus of FIG. 3 yields a bistable characteristic wherein the value of output power is dependent on the history of the input power.

Figure 5:
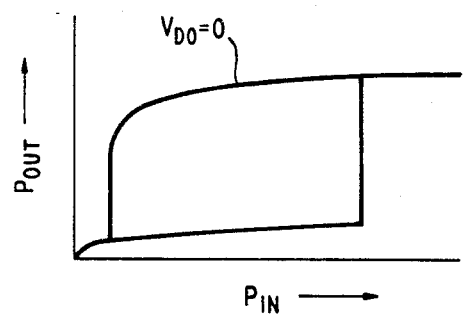
Figure 6:
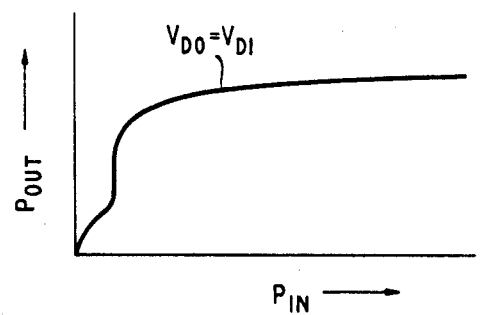

FIG. 5 represents a typical experimental trace of power-out versus power-in provided by apparatus of the type shown in FIG. 3 with the cathode of the avalanche photodiode 30 biased such that the electrode drive voltage for $P_{IN}=0$, $V_{DO}$, is essentially zero. For the device constructed with a 6328Å light coupled into and out of waveguide 11 using microscope objectives, the following switching parameters were obtained: $P_C=70$ nW, $P_S=24$ nW and the extinction ratio when $P_{IN}\approx P_S$ was 12 dB. The shape of this optical transfer function depends in general on the dc bias ($V_{DO}$) that appears across the device when $P_{IN}=0$. If, for example, a bias of $V_{B1}$ is applied to the cathode of the avalanche photodiode such that a drive voltage of $V_{D1}$ is present at terminal 5 when $P_{IN}=0$, the characteristic shown in FIG. 6 is obtained. Essentially, the first loop of curve 40 in FIG. 4 is suppressed thereby causing $P_S$ and $P_C$ to coincide.

Figure 7:
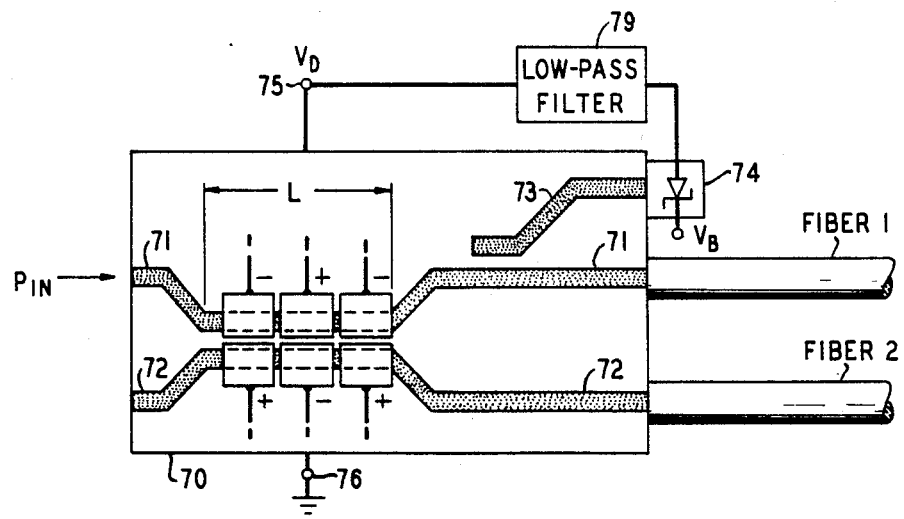
FIG. 7 is a pictorial representation of a device constructed in accordance with the present invention.

Still another device constructed in accordance with the present invention is illustrated in FIG. 7. Two waveguides 71 and 72 are diffused into a lithium niobate substrate 70. A plurality of electrode sections are deposited over the waveguides in the interaction region where the waveguides are parallel and proximate to each other. These electrode sections are identical to the electrode sections disclosed in FIG. 1 and they are connected to terminals 75 and 76 in a way such that alternating dc potentials are applied to the electrode sections. In addition, a third waveguide 73 is diffused into the lithium niobate substrate 70 and positioned with respect to waveguide 71 such that a portion of the optical energy at the output of waveguide 71 is caused to be coupled into waveguide 73. An avalanche photodiode 74 is mounted at the output port of waveguide 73. The cathode of this photodiode 74 is connected to the bias potential $V_B$ and its anode is connected through a low-pass filter to terminal 75. Optical fibers 1 and 2 are cemented to the optical substrate 70 so as to receive the optical energy at the output ports of waveguides 71 and 72, respectively. The operation of the device in FIG. 7 is identical to the operation of the device in FIG. 3, and therefore the power-out versus power-in characteristic of FIG. 4 can also be used to explain its operation.

The operation of the device in FIG. 7 as an optical switch that can be remotely switched by optical pulses at the input port can best be explained by referring to both FIG. 4 and the waveforms A, B and C in FIG. 8. The amplitudes of optical pulse energy coupled to the input port of waveguide 71 is represented by waveform A in FIG. 8. As indicated in waveform A, the input power at a time prior to $T_1$ is normally maintained at a power level slightly in excess of $P_S$. At the time $T_1$, the input power is reduced to 0 during the interval between $T_1$ and $T_2$. This time interval $T_2-T_1$ is sufficient in duration such that the effect of the power change on waveguide 73 is reflected back through low-pass filter 79 as a reset voltage to terminal 75. This decrease of optical power to 0 simply insures that the device will operate along the lower branch of curve 40 in FIG. 4. At time $T_3$ the data pulses appear at the input port of waveguide 71. Low-pass filter 79 has a cutoff characteristic such that the data pulses do not produce a change in the operating characteristic of the device in FIG. 7. These pulses are simply coupled from the input port of waveguide 71 to the output port of waveguide 72 and appear as data pulses on fiber 2 as indicated in waveform C of FIG. 8. The data pulses also produce greatly attenuated data pulses on fiber 1 during the interval between $T_3$ and $T_4$, but these unwanted data pulses are at an extremely low level as indicated in waveform B of FIG. 8.

Subsequent data pulses during a second data interval can be caused to appear at the output of fiber 1 by preceding this second data interval with optical pulses of the type illustrated in waveform A of FIG. 8 between $T_4$ and $T_7$. At time $T_4$ the input power is again reduced to 0 until the time $T_5$ in order to insure that the optical switch is reset to the lower branch of the characteristic illustrated in FIG. 4. At a subsequent time $T_6$ the input optical power is increased to a power level exceeding $P_C$ as indicated in waveform A of FIG. 8. During this interval from $T_6$ to $T_7$, the optical switch is caused to switch to the higher branch of its switching characteristic illustrated in FIG. 4. As a result, subsequent data pulses during the interval from $T_7$ to $T_8$ are caused to appear at the output of fiber 1. Here again these pulses will appear extremely attenuated at the output of fiber 2 as shown in waveform C of FIG. 8, but these unwanted reduced amplitude data pulses can easily be distinguished from the desired data by means of a clipper circuit or device.

What has been described hereinabove is an illustrative embodiment of the present invention. Numerous departures may be made by those skilled in the art without departing from the spirit and scope of the present invention. For example, a beam splitter may be used at the output of waveguide 11 in FIG. 3 in order to provide the energizing radiation for the avalanche photodiode. FIG. 3 under these circumstances would also provide an optical switch having two separate output ports.

What is claimed is:

1. An optical switch comprising a pair of waveguides having mutually parallel portions in sufficient proximity for $\Delta\beta$-switched directional coupling therebetween, and control means comprising at least two sets of electrode elements disposed about adjacent sections of said parallel portions of said waveguides, said control means having an input connected to said at least two sets of electrode elements in a way such that a voltage connected to said input results in opposite electric fields in said adjacent sections of said waveguides, characterized in that said optical switch further includes means for detecting optical energy at an output port of one of said waveguides to develop a control voltage, and means for coupling said control voltage to the input of said control means, whereby optical power present at an input port of one of said waveguides is coupled primarily through to an output port of one of said waveguides, the particular one being dependent on the previous optical powers present at said input port.

2. An optical switch as defined in claim 1 wherein said pair of waveguides are diffused into an electro-optic substrate, and said detecting means includes an avalanche photodiode positioned so as to detect optical power present at an output port of one of said waveguides.

3. An optical switch as defined in claim 2 wherein said detecting means further includes a third waveguide diffused into said electro-optic medium and positioned such that said third waveguide receives energy from one of said pair of waveguides.

4. An optical switch as defined in claim 3 wherein said coupling means includes a low pass filter means.

5. An optical switch comprising an electro-optic substrate having at least two waveguides diffused into said substrate and positioned in said substrate so as to be parallel to and proximate to each other for a sufficient interaction length to permit $\Delta\beta$-switched directional coupling between said waveguides, and at least two sets of electrode elements positioned proximate to adjacent sections of said waveguides in the region of said interaction length and arranged such that opposite electric fields can be established in said adjacent sections of said waveguides by potentials applied to said electrode means, characterized in that said optical switch further includes means for detecting optical energy present at an output port of one of said waveguides to develop a potential whose magnitude represents the intensity of the detected radiation, and means for coupling said potential to said electrode means.

6. An optical switch as defined in claim 5 wherein said detecting means is an avalanche photodiode.

7. An optical switch as defined in claim 6 wherein said optical switch further includes a third waveguide diffused into said electro-optic substrate and positioned so as to permit coupling of optical energy from one of said waveguides into said third waveguide, said avalanche photodiode being mounted so as to develop a potential in response to the optical energy present in said third waveguide.

8. An optical switch as defined in claim 7 wherein said means for coupling includes a low pass filter means.

* * * * *